July 24, 1934.  G. PASINI  1,967,561

REENFORCED CONCRETE CONDUIT FOR ELECTRIC CABLES

Filed May 11, 1933

G. Pasini
INVENTOR

By Marks & Clerk
ATTYS.

Patented July 24, 1934

1,967,561

UNITED STATES PATENT OFFICE 1,967,561

REENFORCED CONCRETE CONDUIT FOR ELECTRIC CABLES

Giovanni Pasini, Rome, Italy

Application May 11, 1933, Serial No. 670,588
In Italy May 25, 1932

1 Claim. (Cl. 247—36)

My present invention has for its object to provide a subterranean way of reenforced concrete for laying telephonic, telegraphic and electric cables generally.

One of the objects of my invention is to utilize at its maximum the space of the subterranean cable way.

Another object of the invention is to facilitate laying and exchanging of cables.

A further advantage of my invention consists in the economical building and equipping of the subterranean cable-way.

Figure 1:
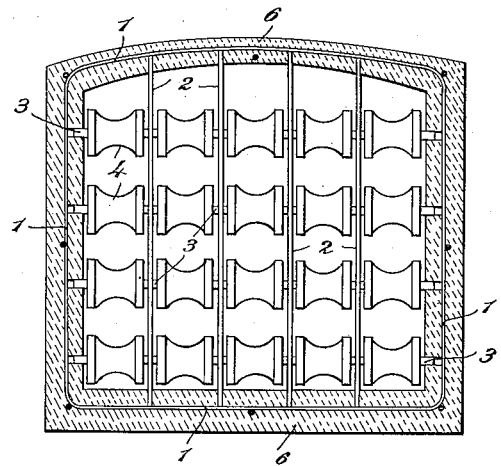
Figure 2:
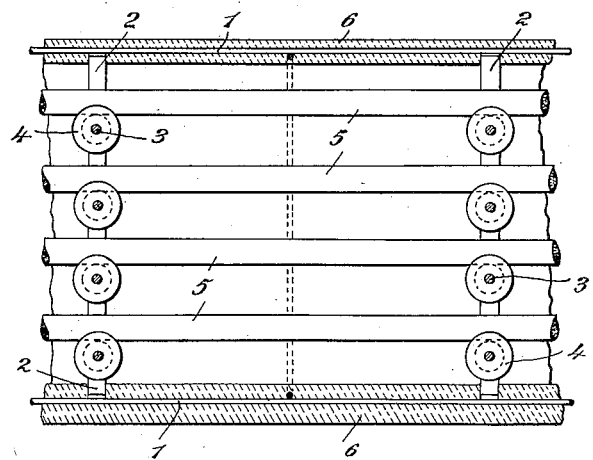

Other advantages will appear from the following description as referred to the annexed drawing, in which Fig. 1 shows a vertical cross section, and
Fig. 2 a longitudinal section of the subterranean cable-way according to my invention.

The skeleton of the cable-way is constituted by transversely arranged iron frames connected together by longitudinal iron rods. The frames are formed of flat or profiled irons 1 (according to the strains they are to stand), and which support, by means of suitable flat irons 2 and rods 3,—rollers or reels 4 on which the cables 5 may be placed. Said rollers or reels 4 may be made of wood, earthware, china, glass, eternite, or any other suitable material. The distance of the frames is chosen according to the type of cable to be laid, and may vary for instance from m.0,70 to m.1.00, but it is obvious that these measures are only given by way of example and may be varied as circumstances require.

The concrete 6 may be put in place on the spot. In order to prevent dangerous strains in the subterranean cable-way due to small earth-slips suitable joints may be provided allowing of yielding, up to a certain degree, of the various sections of the subterranean cable-way.

The advantages obtained with my new type of subterranean cable-way may be described as follows:

(1) The space is better utilized than in the known types of tubing or subterranean cable ways or galleries with lateral brackets;

(2) laying and exchanging is substantially facilitated;

(3) plumbed cables may be laid instead of reenforced or juted ones, which is a material economy;

(4) the highest safety is secured because the cables are not in contact with the walls or bottom of the subway, and therefor always remain perfectly dry;

(5) existing cables may be laid in any improved subterranean cable way which follow the same path during building of sub-way;

(6) the greatest economy is attained because the cable-carrying brackets at the same time form the skeleton of the subterranean cable-way;

(7) the greatest adaptability to the varying conditions of soil is obtained because the various layers of cables may be arranged in different ways, and at last (8) maximum solidity is secured because the transverse skeleton, by the force of circumstances, is particularly heavy.

The above described and illustrated form of invention is only given by way of example and is liable to structural modifications within a wide range within the scope of my invention as defined in and by the following claim.

Having now particularly described and ascertained the nature of my said invention and in what manner the same is to be performed, I. declare that what I claim is:

A conduit for electric cables and the like comprising a concrete wall extending continuously around the conduit and providing a conduit generally rectangular in cross-section, a series of reenforcing frames positioned transversely of the conduit in spaced relation to each other, each of said frames being continuous and embedded in the concrete of the wall to extend around the conduit, rods embedded in the concrete wall and extending longitudinally of the conduit in spaced relation and attached to the transverse frames, a series of vertical bars spaced apart and extending across the conduit between the upper and lower extensions of each transverse frame, and cable carriers mounted on the vertical bars.

GIOVANNI PASINI.